US007225336B2

(12) United States Patent
Zunke

(10) Patent No.: US 7,225,336 B2
(45) Date of Patent: *May 29, 2007

(54) SYSTEM AND A METHOD FOR GIVING RUN AUTHORIZATION TO A PROGRAM INSTALLED ON A COMPUTER

(75) Inventor: Michael Zunke, Aschheim (DE)

(73) Assignee: Aladdin Europe GmbH, Germering (DE)

( * ) Notice: Subject to any disclaimer, the term of this patent is extended or adjusted under 35 U.S.C. 154(b) by 620 days.

This patent is subject to a terminal disclaimer.

(21) Appl. No.: 10/013,159

(22) Filed: Dec. 10, 2001

(65) Prior Publication Data

US 2002/0087873 A1    Jul. 4, 2002

(30) Foreign Application Priority Data

Dec. 29, 2000   (DE)   ............................ 100 65 684

(51) Int. Cl.
*H04L 9/00* (2006.01)
(52) U.S. Cl. ...................................... 713/168; 380/259
(58) Field of Classification Search ................ 713/173
See application file for complete search history.

(56) References Cited

U.S. PATENT DOCUMENTS

| | | | | |
|---|---|---|---|---|
| 6,088,450 A | * | 7/2000 | Davis et al. ................ | 713/182 |
| 6,088,802 A | | 7/2000 | Bialick et al. | |
| 6,134,659 A | | 10/2000 | Sprong et al. | |
| 6,137,480 A | | 10/2000 | Shintani | |
| 6,175,922 B1 | * | 1/2001 | Wang .......................... | 713/182 |
| 6,223,291 B1 | * | 4/2001 | Puhl et al. ................... | 713/201 |
| 6,509,829 B1 | * | 1/2003 | Tuttle ......................... | 340/10.1 |
| 6,886,095 B1 | * | 4/2005 | Hind et al. ................. | 713/168 |

FOREIGN PATENT DOCUMENTS

| | | |
|---|---|---|
| DE | 19706494 A1 | 2/1997 |
| DE | 19929049 A1 | 6/1999 |
| WO | WO98/39702 | 9/1998 |
| WO | PCT/US00/04469 | 2/2000 |

OTHER PUBLICATIONS

GeraldQ. Maguire Jr., Mark T. Smith, H.W. Peter Beadle; SmartBadges: a wearable computer and communciation system; 1998.*
Bo Zou; Mobile ID Protocol: A Badge-activated application level handoff of a multimedia streaming to support user mobility; Aug. 2000.*

* cited by examiner

*Primary Examiner*—Nasser Moazzami
*Assistant Examiner*—Pramila Parthasarathy
(74) *Attorney, Agent, or Firm*—Mark M. Friedman

(57) ABSTRACT

A system for giving run authorization to a program installed on a computer, comprising a checking unit having a receiving device and, at least partially, forms part of the computer or is linked with the latter via a data link, and a device which is transportable separately from the computer and from the checking unit and connectable to the receiving device within a predetermined distance therefrom by a wireless link through which an identification code contained in said device is transmitted to the checking unit, said checking unit comparing the transmitted identification code with a reference code and giving the run authorization, if both codes are identical.

42 Claims, 1 Drawing Sheet

SYSTEM AND A METHOD FOR GIVING RUN AUTHORIZATION TO A PROGRAM INSTALLED ON A COMPUTER

FIELD OF THE INVENTION

The present invention relates to improvement in system and a method for giving run authorization to a program installed on a computer, said authorization being given, if an identification code is identical with a reference code. This prevents the use of an unauthorized copy on another computer, so that a software copy protection is realized.

BACKGROUND OF THE INVENTION

In one such system, for example, the MAC address of a network card installed in the computer, the serial number of the BIOS or of the hard disk may be used as the identification code. Upon each start of the program, the MAC address or the corresponding serial number may be compared with the reference code. If both are identical, the program is enabled to run and is executable. This system has the disadvantage that the run authorization of the program is linked with the presence of a hardware component (network card, hard disk) or software component (BIOS) of the computer, so that upon failure of such component (e.g. due to a defect) or upon replacement of such component, the program may no longer be authorized to run.

It is further known to check the authorization of a program to run on a computer by checking, every time the program is started, that a license number entered during installation of the program is authentic. This license number is usually given to the user when purchasing the program, e.g. in the form of a label on the packaging of the program. This method has the disadvantage that it allows the program to be installed in an executable manner and to be executed at the same time on different computers, since the authorization to run the program is determined only by checking the authenticity of the license number and not, e.g., by linking it to a unique component of the computer on which the program is intended to run.

Finally, it is also known to use a so-called "dongle" for checking the authorization of a program to run. A dongle is a hardware element connected to the computer (e.g. via the serial or the parallel port). The program is designed such that, when it is started, it checks whether the dongle is connected to the computer. If this is the case, the program is authorized to run. In this method, the dongle must be distributed by the software manufacturer as well, which leads to increased costs. Further, the dongle also occupies a port of the computer.

SUMMARY OF THE INVENTION

According to the invention, it is an object of the present invention to provide a system and a method for giving run authorization to a program installed on a computer, by which the above-described difficulties are almost completely eliminated.

According to the invention, this object is achieved by a system for giving run authorization to a program installed on a computer, said system comprising a checking unit which includes a receiving device and, at least partially, forms part of the computer or is linked with the latter via a data link, and a device which is transportable separately from the computer and from the checking unit and is linkable to the receiving device within a predetermined distance therefrom by a wireless link through which an identification code contained in said device may be transmitted to the checking unit, which checking unit compares the transmitted identification code with a reference code and gives the run authorization, if both codes are identical.

Since the identification code is stored in the device, which is transportable separately from the computer and separately from the checking unit, the checking of the run authorization no longer depends on the presence of a specific computer component, so that failure or replacement of this computer component will not lead to forfeiture of the run authorization. Due to the identification code being transmitted via the wireless link, the device and the computer may be mechanically uncoupled, and no electrical line is required between the checking unit and the device.

In particular, the device may be a hardware element which is required neither for conventional operation of the computer nor for execution of other programs on the computer. It is used merely in order to determine the presence of the run authorization of the one particular program, and, consequently, it need not be permanently linked with the receiving device of the checking unit.

The receiving device may preferably be designed as a transmitter/receiver. Thus, it may, for example, start establishing the wireless link by emitting a predetermined request signal to which the device then responds in a wireless mode. The device used is preferably a portable device, which may be carried by the user of the program. Such device may be, in particular, a mobile phone, a portable computer (e.g. a PDA) or even a pendant (e.g. a key ring). Thus, the function of software copy protection in the system according to the invention is coupled to a portable (personal) device of the program user and no longer depends on which particular computer the program is installed on. Thus, the program user may use the program on a computer of his own choice.

Therefore, in the system according to the invention, the run authorization or the program license is no longer associated with the computer, on which the program is installed, as has been usual previously, but with the (personal) device and thus the user himself or with the person carrying the device. Thus, a virtually personalized software license may be realized.

The comparison between the identification code and the reference code maybe realized in the most diverse manners. Thus, for example, both codes may simply be compared directly with each other. However, one of the codes may also be encrypted, and no comparison is carried out until the encrypted code has been decrypted or the non-encrypted code has been encrypted. Of course, both codes may be encrypted as well, so that they are first decrypted and then compared. Known methods may be used for such encrypting or decrypting, in symmetrical methods, only one key is used, while in asymmetrical methods, one secret and one public key are used. It is also possible that the reference code is provided with a digital signature which the checking unit checks before comparing the codes, in order to ensure that the reference code is an authorized reference code (e.g. by the distributor of the program).

In a preferred embodiment of the system according to the invention, the identification code is a unique identifier of the device. Consequently, there is only one single device in which the identification code corresponding to the reference code is stored, so that the reference code is also unique, which advantageously allows the program to run only on one computer, but not on several computers at the same time.

Advantageously, the checking unit of the system according to the invention contains a software module for comparing the identification code with the reference code. Thus, a desired comparing procedure (e.g. with encryptions of one or both codes) may be realized in a simple manner.

It is further preferred that the identification code of the device may be determined as the reference code when installing the program on the computer. This enables the user of the program to choose by himself to which device the run authorization of the program should be coupled. Thus, he may select, e.g. his mobile phone or any other portable device, which he usually carries with him. The installation of a program, in this case, is the installation of the program on the computer. For example, this also includes the case where the reference code is not determined until the program is started for the first time or even until a later point (e.g. after several program starts, if the user of the program wishes to couple the run authorization to another device).

In the system according to the invention, the device comprises, in particular, a non-volatile memory in which the identification code is stored. This allows the identification code to be permanently stored in the device. It is further advantageous if the identification code is unchangeably stored, e.g. if it is stored in a read-only memory, such as, for example, a ROM.

A further preferred embodiment of the system according to the invention consists in that the device is a mobile phone or a portable computer. Since the user of the program usually always carries these devices with him, the run authorization for the program is present every time he sits at the computer and intends to use the program.

The system according to the invention may be further embodied, in particular, in that the wireless link is a radio link, preferably in the GHz range according to the Bluetooth standard as specified by the Bluetooth Special Interest Group.

In the method according to the invention for giving run authorization to a program installed on a computer, an identification code contained in a device is requested from said device via a wireless link and compared with a reference code, and the run authorization is given, if both codes are identical. Due to the transmission of the identification code via the wireless link, there need not be a mechanical connection between the device and the computer. Use is preferably made of a portable device which the user of the program usually carries with him and which, in particular, is otherwise not required for operation of the computer (e.g. for executing other programs).

In a further embodiment of the method according to the invention, a unique identifier of the device is used as the identification code. Thus, the identification code and also the reference code is unique, so that the program can only be used by the user carrying the device with him.

The identification code is preferably determined as the reference code when the program is installed on the computer. This allows the user of the program to select a device to which the run authorization is to be coupled. In particular, the user may also link the run authorizations of different programs to the same device.

In the method according to the invention, the reference code is advantageously determined by transmitting the identification code of the device to a license provider for the program, where the identification code is then determined as the reference code. If there is a data link between the license provider and the computer, on which the program is intended to run (e.g. via the internet), this particular reference code can be transmitted to the computer, and thus to the checking unit, via the data link. The license provider may be structured or operated such that the identification code is determined as the reference code only if an enabling code is transmitted to the license provider. For example, this may be a unique enabling code distributed together with the program. In particular, such enabling code may be suitably enclosed with the program (e.g. printed on a piece of paper or label). If this enabling code is forwarded to the license provider for the first time, the latter will enable the use of the program for the transmitted identification code and record this in a database. If the enabling code is transmitted to the license provider a second time, the latter will determine, by a comparison with the database, that the program has already been enabled to be used for this enabling code and will not enable use of the program again, i.e. the identification code will not be determined as the reference code. Of course, it is also possible to provide a further procedure in case the enabling code is transmitted to the license provider a second time, by which procedure the program is enabled to be used nevertheless, if further information is present. Thus, the user may have acquired a multiple license and, consequently, have the program enabled to be used several times.

These steps enable the user to easily determine which device shall be used to check the run authorization of the program. Thus, the applicant himself may choose whether the ran authorization of the program shall be coupled, e.g., to his mobile phone or to his key ring.

In particular, the identification code may also be transmitted to the license provider through a network, such as the internet, or via a direct data link. Particularly advantageously, the program may then be distributed via said data link or network, and at the same time, the verification of the run authorization may be linked via said network or data link (transmission of the determined reference code) to the device selected by the user. In particular, it is also possible for the user to select a desired program via a data link between his computer and a distributor and to transmit the identification code of a device of his own choice to the distributor (who also operates as the license provider). For example, when payment has been effected, the distributor will transmit the desired program, together with the determined reference code, to the computer of the user via said data link. This enables rapid distribution of programs and at the same time ensures that the program thus distributed runs only if the identification code of the device selected by the user is fed to the checking module. Thus, the run authorization may be coupled to a device desired by the user, even if there is only a data link between the computer of the user and the distributor.

Preferably, the wireless link between the device and the checking module is automatically established when the distance between them is below a predetermined value. This distance is chosen such that it definitely falls below said value if the user is working on the computer, while carrying with him the device in which the identification code is stored. This ensures that the run authorization of the program is determined when the user is sitting at the computer and intends to work with the program.

Particularly advantageously, the method according to the invention and the system according to the invention maybe further embodied such that the identification code is not fed to the checking unit until an enabling code has been entered into the device. Such enabling code may be, e.g., a four-digit number which is entered into the device via a corresponding input unit. Thus, the user may, for example, bar third parties from using the program, even if they are in possession of the device containing the identification code.

In a further advantageous embodiment, the wireless link between the device and the checking unit is a radio link in the GHz range, allowing the establishment of the wireless link to be ensured, even if there is no visual contact between the device and the checking unit, as required in the case of an infrared link.

In particular, the identification code may be the Bluetooth address (defined according to the standard of the Bluetooth Special Interest Group) of the device, but, of course, the identification code may also contain the Bluetooth address in encrypted or in non-encrypted form or may be derived therefrom, thus advantageously achieving a uniqueness of the identification code due to the uniqueness of the Bluetooth address. Further, the user may select any Bluetooth-enabled device to which he wishes to couple the run authorization.

BRIEF DESCRIPTION OF THE DRAWING

These and other objects of the present invention and various features and details of the operation and construction thereof are hereinafter more fully set forth with reference to the accompanying drawing, wherein.

DETAILED DESCRIPTION OF THE PREFERRED EMBODIMENT

Figure 1:
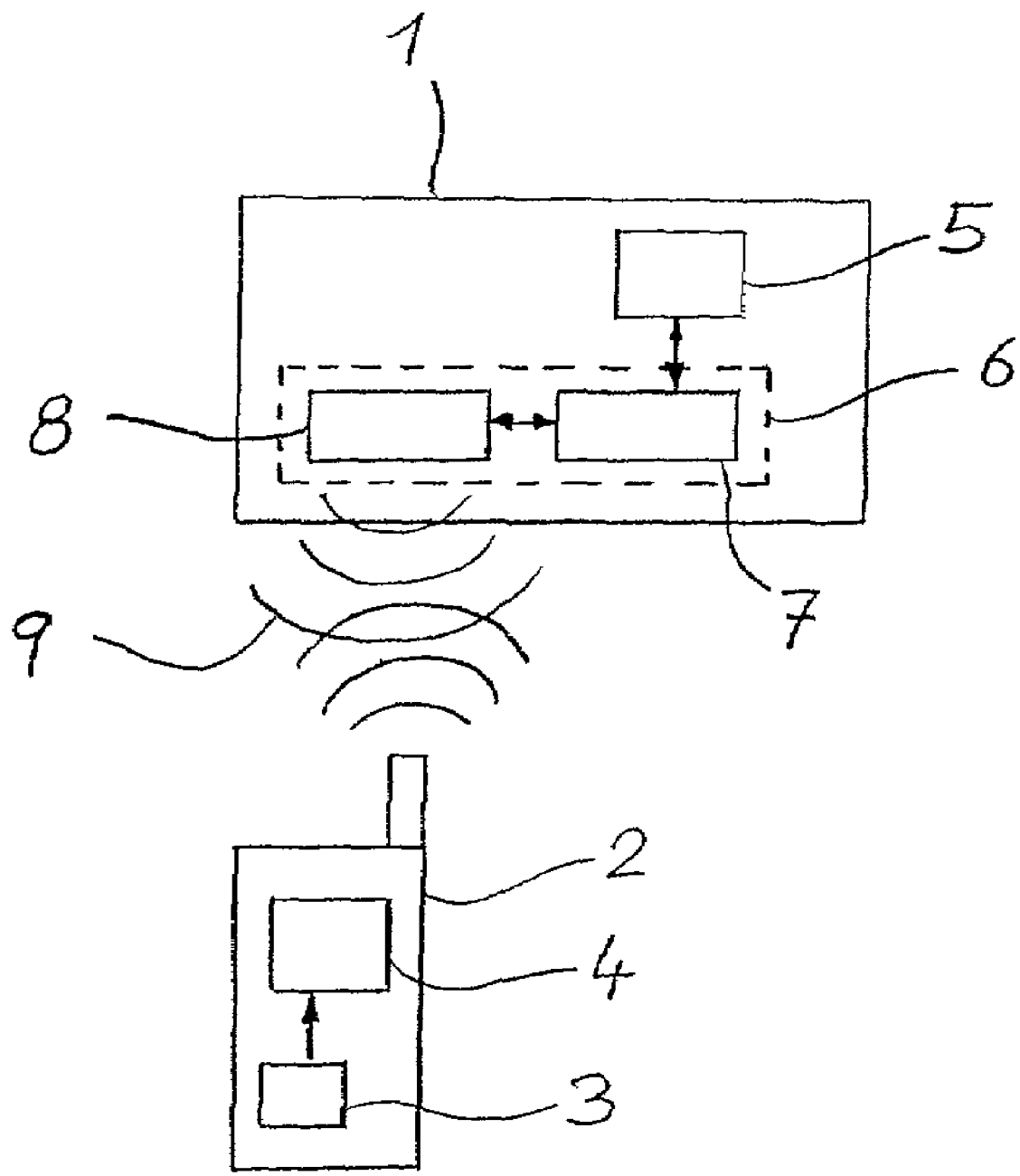
FIG. 1 is shown a schematic view of a system and method for giving run authorization to a program in accordance with the present invention.

Referring now to the drawing, there is a schematic representation of the system according to the invention, which comprises a computer 1 and a device 2, which is independent of said computer. The device 2 is a device which is preferably not required for normal operation of the computer. In the example described herein, the device 2 is a mobile phone, which is in turn independent of computer 1 for normal operation.

The device 2 contains at least one memory 3 and one transmitter/receiver 4. In memory 3, which may be, for example, a ROM, a unique identification code of the device 2 is stored, which is preferably unchangeable. Further, the device may comprise still further components (not shown). In the present example, it also comprises the components required to use a mobile phone for its intended purpose.

The computer 1 comprises a program 5 (e.g. a CAD software program), which is installed thereon and whose run authorization is to be checked and given, and a checking unit 6 comprising a checking module 7 and a transmitter/receiver 8. In addition, the computer 1 contains, for example, still further components (not shown) of a conventional personal computer and may be connected to various peripheral devices (not shown), such as a printer, a scanner, a screen, a keyboard, and a mouse.

Together, the transmitter/receiver 4 and the transmitter/receiver 8 constitute a transmitting device, by which the identification code of the device 2, which is stored in the memory 3 and may be read out by the transmitter/receiver 4, may be transmitted to the checking unit 6 via a wireless link 9. In particular, the wireless link 9 is a radio link, which works, for example, according to the Bluetooth standard defined by the Bluetooth Special Interest Group. In this case, the unique identification code of the device 2 is advantageously the Bluetooth address of the device or is based thereon or derived therefrom, because this already represents a unique identifying feature or a unique identifier.

The checking module 7 of the checking unit 6 may be realized as software, software and hardware, or as hardware only. If it is realized as software, it may also be part of the program 5 itself, whose run authorization is to be verified and given. In the program 5, in the checking module 7 or in any other place known to the checking module 7, a reference code authorizing the execution of the program is stored.

The verification of the run authorization of the program 5 is effected as follows. When the program 5 is to be started on the computer 1, the program 5 inquires at the checking module 7 whether the run authorization is present. The checking module 7 in turn activates the transmitter/receiver 8, which in turn establishes the wireless link 9 to the device 2, if said link is not yet in existence, and requests the device 2 to transmit its identification code. Next, in the device, the transmitter/receiver 4 reads the identification code out from the memory 3 and transmits it to the transmitter/receiver 8 of the checking unit 6 via the wireless link. The transmitter/receiver 8 transmits this identification code to the checking module 7, and the checking module 7 then determines whether the received identification code corresponds to the reference code for the program 5. If this is the case, the checking module 7 determines the presence of the run authorization 5 and enables use of the program 5. This verification may also be repeated, during execution of the program, at predetermined intervals or even when calling up pre-established program functions. The verification does not have to be effected immediately upon starting the program, but may also be effected later.

The way in which the checking module 7 compares the identification code of device 2 transmitted to it with the reference code depends, e.g., on how the reference code is embedded in the program 5, in the checking module 7 or in any other place known to the checking module 7. For example, the reference code may be stored in non-encrypted form. In this case, the presence of a run authorization is determined by a direct comparison between the stored reference code and the identification code transmitted via the wireless link 9. Alternatively, the reference code may also be stored in encrypted form, and the transmitted identification code is then also encrypted during verification, and both encrypted values are compared, or the reference code stored in encrypted form is decrypted and then compared with the transmitted identification code.

The reference code, which is stored in encrypted form may be encrypted either by a symmetrical encryption method, wherein the same secret key is used for both encrypting and decrypting, or by an asymmetrical encryption method, wherein the decryption and the encryption are carried out using different keys. In the asymmetrical encryption method, encryption is preferably effected using the secret key, thus allowing decryption using the public key.

Preferably, embedding of the reference code in the program 5 or in the checking module 7 may be carried out as follows, if the program 5 is downloaded via a data link, such as the internet.

The user establishes the data link between his computer 1 and a computer of the provider of the desired program. Once the user has selected the desired program and, if required, payment has been settled, the identification code of the device 2 is transmitted to the provider via the wireless link 9 and via the data link. The user himself can determine which device he wishes to use as device 2. Thus, for example, he may select his mobile phone, which he usually carries with him. The provider embeds the identification code of the device 2 transmitted to him into the desired program 5 and transmits the thus-changed program 5 to the computer 1 of the user. The program 5 contains the checking module 7, so that, on his computer 1, the user will receive a program whose run authorization is coupled to the identification code of the device 2.

Alternatively, only the embedding of the reference code via the data link may be carried out. When installing the program, the user is requested to provide a device to whose identification code the run authorization is to be coupled. Once he has done so, this identification code is transmitted via the data link, e.g. the internet, together with an authorization (e.g. a unique serial number on the packaging), to the provider who will then transmit the identification code as the reference code to the computer 1 and thus to the program 5. The reference code may be transmitted to the computer together with a digital signature, so that the checking module may safely determine that the existing reference code is actually authorized by the provider of the program.

Further, it is also possible to have such authorization effected directly when purchasing the program in a store, if the user is carrying his desired device (e.g. a mobile phone) with him. In this case, the identification code may be stored, e.g., directly on a data carrier or in connection with a supplementary program. This requires the presence of only one computer comprising a transmitter/receiver for receiving the identification code of the device and a corresponding software by which the required data is then stored on the data carrier. When installing the program on the computer of the user, the data carrier must then be inserted, and the reference code is embedded in the program or in the checking module.

It is not mandatory for the checking unit 6 to be included in the computer 1, but, if the computer 1 is, for example, part of a network, it may also be present at any other location in the network. However, in this case, the transmitter/receiver 8 must be within the range of the transmitter/receiver 4 of the device 2. Alternatively, of course, only the checking module 7 of the checking unit 6 may be present at a different location in the network, and the transmitter/receiver 8 remains in or at the computer 1.

Further, different checking modules and checking units for different programs may be contained in one single license manager, which is either provided in the computer 1 or present in the network, if the computer is part of a network. This allows different programs on one computer to be coupled with one device 2 or even with different devices, as determined by the user.

Thus, the method and the system according to the invention allow a new copy protection to be realized, wherein the run authorization or the license is virtually associated with the program user (via the device carried by him) and no longer with the computer on which the program is installed.

Even though a particular embodiment of the invention has been illustrated and described herein, it is not intended to limit the invention and changes and modifications may be made therein within the scope of the following claims.

What is claimed is:

1. A system for selectively giving run authorization to one of a plurality of programs installed on a computer, comprising a checking unit having a receiver and, at least partially, forms part of the computer or is linked with the latter via a data link, and a device which is transportable separately from the computer and from the checking unit and connectable to the receiver within a predetermined distance therefrom by a wireless link through which an identification code contained in said device is transmitted to the checking unit to request the run authorization, said checking unit comparing the transmitted identification code with a tamper-resistant reference code to verify that the transmitted identification code represents a license to run the program and giving the run authorization, if both codes are identical, wherein, apart from said run authorization, running the one program on the computer is independent of said device, and wherein, apart from requiring the run authorization to run the one program, running the programs on the computer is independent of the device.

2. The system as claimed in claim 1, wherein the identification code is a unique identifier of the device.

3. The system as claimed in claim 1, wherein the checking unit contains a software module for comparing the identification code with the reference code.

4. The system as claimed in claim 1, wherein the identification code of the device may be defined as the reference code when installing the program on the computer.

5. The system as claimed in claim 1, wherein the device comprises a non-volatile memory in which the identification code is stored.

6. The system as claimed in claim 1, wherein the device is a mobile phone or a portable computer.

7. The system as claimed in claim 1, wherein the wireless link is a radio link, in particular a Bluetooth radio link.

8. The system as claimed in claim 1, wherein the device comprises an input unit through which an enabling code may be entered, the device enabling the transmission of the identification code only upon entering a predetermined enabling code.

9. The system of claim 1, wherein the reference code is an encrypted reference code.

10. The system of claim 9, wherein the reference code is decrypted for comparison with the identification code.

11. The system of claim 9, wherein the identification code is encrypted for comparison with the reference code.

12. The system of claim 9, wherein the reference code is a symmetrically encrypted reference code.

13. The system of claim 9, wherein the reference code is an asymmetrically encrypted reference code.

14. The system of claim 1, wherein the reference code is a digitally signed reference code.

15. A system for selectively giving run authorization to one of a plurality of programs installed on computer, comprising: a remote, independent device with means for transmitting an identification code to request the run authorization; and a checking unit with means for receiving said identification code, checking said code against a stored, tamper-resistant reference code to verify that the identification code represents a license to run the one program, and means for transmitting code verification for giving run authorization to said one program installed on said computer, wherein, apart from said run authorization, running the one program on the computer is independent of said device, and wherein, apart from requiring the run authorization to run the one program, running the programs on the computer is independent of the device.

16. The system of claim 15, wherein the reference code is an encrypted reference code.

17. The system of claim 16, wherein the reference code is decrypted for comparison with the identification code.

18. The system of claim 16, wherein the identification code is encrypted for comparison with the reference code.

19. The system of claim 16, wherein the reference code is a symmetrically encrypted reference code.

20. The system of claim 16, wherein the reference code is an asymmetrically encrypted reference code.

21. The system of claim 15, wherein the reference code is a digitally signed reference code.

22. A method for selectively giving run authorization to one of a plurality of programs installed on a computer, which method comprises requesting an identification code contained in a device via a wireless link and comparing it with a tamper-resistant reference code to verify that the identification code represents a license to run the one program, and giving the run authorization, if both codes are identical, wherein, apart from said run authorization, running the one program on the computer is independent of said device, and wherein, apart from requiring the run authorization to run the one program, running the programs on the computer is independent of the device.

23. The method as claimed in claim 22, wherein a unique identifier of the device is read out as the identification code.

24. The method as claimed in claim 22, wherein the identification code of the device is defined as the reference code when installing the program on the computer.

25. The method as claimed in claim 22, wherein a license provider for the program, to whom the identification code of the device is transmitted, defines the transmitted identification code as the reference code.

26. The method as claimed in claim 25, wherein the identification code is transmitted to the computer by a wireless link and is transmitted from the computer to the license provider via a data link, and the identification code is transmitted as the reference code from the license provider to the computer via said data link.

27. The method as claimed in claim 22, wherein the identification code is read out by a checking unit via a wireless link between the device and the checking unit, said wireless link being established automatically as soon as the distance between the device and a receiver of the checking unit is below a predetermined value.

28. The method as claimed in claim 22, wherein the identification code is read out by the checking unit after an enabling code has been entered into the device.

29. The method as claimed in claim 22, wherein a radio link in the GHz range, in particular a Bluetooth radio link, is used as the wireless link.

30. The method of claim 22, wherein the reference code is an encrypted reference code.

31. The method of claim 30, further comprising the step of decrypting the reference code before comparing the identification code therewith.

32. The method of claim 30, further comprising the step of encrypting the identification code before comparing the reference code therewith.

33. The method of claim 30, wherein the reference code is a symmetrically encrypted reference code.

34. The method of claim 30, wherein the reference code is an asymmetrically encrypted reference code.

35. The method of claim 22, wherein the reference code is a digitally signed reference code.

36. A method of selectively giving run authorization for running one of a plurality of programs on a computer, which method comprises requesting an identification code contained in a device via a wireless link and comparing it with a tamper-resistant reference code to verify that the identification code represents a license to run the program, and giving the run authorization, if both codes are identical;
  wherein, apart from said run authorization, running the one program on the computer is independent of said device;
  wherein a license provider for the program, to whom the identification code of the device is transmitted, defines the transmitted identification code as the reference code;
  wherein the identification code is transmitted to the computer by a wireless link and is transmitted from the computer to the license provider via a data link, and the identification code is transmitted as the reference code from the license provider to the computer via said data link;
  wherein the program is also transmitted from the license provider to the computer via said data link;
  and wherein, apart from requiring the run authorization to run the one program, running the programs on the computer is independent of the device.

37. The method of claim 36, wherein the reference code is an encrypted reference code.

38. The method of claim 37, further comprising the step of decrypting the reference code before comparing the identification code therewith.

39. The method of claim 37, further comprising the step of encrypting the identification code before comparing the reference code therewith.

40. The method of claim 37, wherein the reference code is a symmetrically encrypted reference code.

41. The method of claim 37, wherein the reference code is an asymmetrically encrypted reference code.

42. The method of claim 36, wherein the reference code is a digitally signed reference code.

* * * * *